US011600260B1

(12) United States Patent
Puthucode Krishnamoorthy et al.

(10) Patent No.: US 11,600,260 B1
(45) Date of Patent: Mar. 7, 2023

(54) UTTERANCE GENERATION AND EVALUATION

(71) Applicant: Amazon Technologies, Inc., Seattle, WA (US)

(72) Inventors: Vaidyanathan Puthucode Krishnamoorthy, Seattle, WA (US); Deepak Babu P R, Bellevue, WA (US); Ashwin Gopinath, Redmond, WA (US); Sethuraman Ramachandran, Issaquah, WA (US); Ankit Tiwari, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 178 days.

(21) Appl. No.: 17/093,270

(22) Filed: Nov. 9, 2020

(51) Int. Cl.
*G10L 15/06* (2013.01)
*G10L 15/22* (2006.01)
*G06Q 20/12* (2012.01)
*G10L 15/16* (2006.01)

(52) U.S. Cl.
CPC ............ *G10L 15/063* (2013.01); *G06Q 20/12* (2013.01); *G10L 15/16* (2013.01); *G10L 15/22* (2013.01); *G10L 2015/223* (2013.01); *G10L 2015/227* (2013.01)

(58) Field of Classification Search
CPC ....... G10L 15/16; G10L 15/22; G10L 15/063; G10L 2015/223; G10L 2015/227; G10L 15/30; G06Q 20/12; G06N 3/088
See application file for complete search history.

(56) References Cited

U.S. PATENT DOCUMENTS

| 10,559,299 | B1* | 2/2020 | Arel | G06N 3/088 |
|---|---|---|---|---|
| 10,692,496 | B2* | 6/2020 | Gruenstein | G10L 15/08 |
| 11,081,104 | B1* | 8/2021 | Su | G06F 40/216 |
| 11,132,509 | B1* | 9/2021 | Pasko | G06K 9/6267 |
| 2011/0060587 | A1* | 3/2011 | Phillips | G10L 15/30 |
| | | | | 704/235 |
| 2021/0050001 | A1* | 2/2021 | Chen | G09B 19/04 |

FOREIGN PATENT DOCUMENTS

WO WO-2018081970 A1 * 5/2018 ............. G06N 20/00

\* cited by examiner

*Primary Examiner* — Michael Colucci
(74) *Attorney, Agent, or Firm* — K&L Gates LLP

(57) ABSTRACT

Devices and techniques are generally described for generating and evaluating utterances. In some examples, an utterance generation and evaluation system can receive intent data and target data. The utterance generation and evaluation system can determine related target names and related intent names and, based on the related target names and related intent names, can generate an utterance phrase. The utterance generation and evaluation system can determine a confidence score associated with the utterance phrase and, based on the confidence score, determine the utterance phrase as a recommended utterance phrase.

18 Claims, 6 Drawing Sheets

UTTERANCE GENERATION AND EVALUATION

BACKGROUND

Automatic speech recognition (ASR) combined with language processing techniques can enable a computing device to retrieve and process commands from a user based on spoken commands of the user. Natural language processing can be used to translate the spoken commands into computer-executable instructions. The executable instructions can be executed and a corresponding task can be performed. Such speech recognition and voice control can be used by personal computers, hand-held devices, telephone computer systems, and a wide variety of other computing devices to improve human-computer interactions.

DETAILED DESCRIPTION

Figure 1:
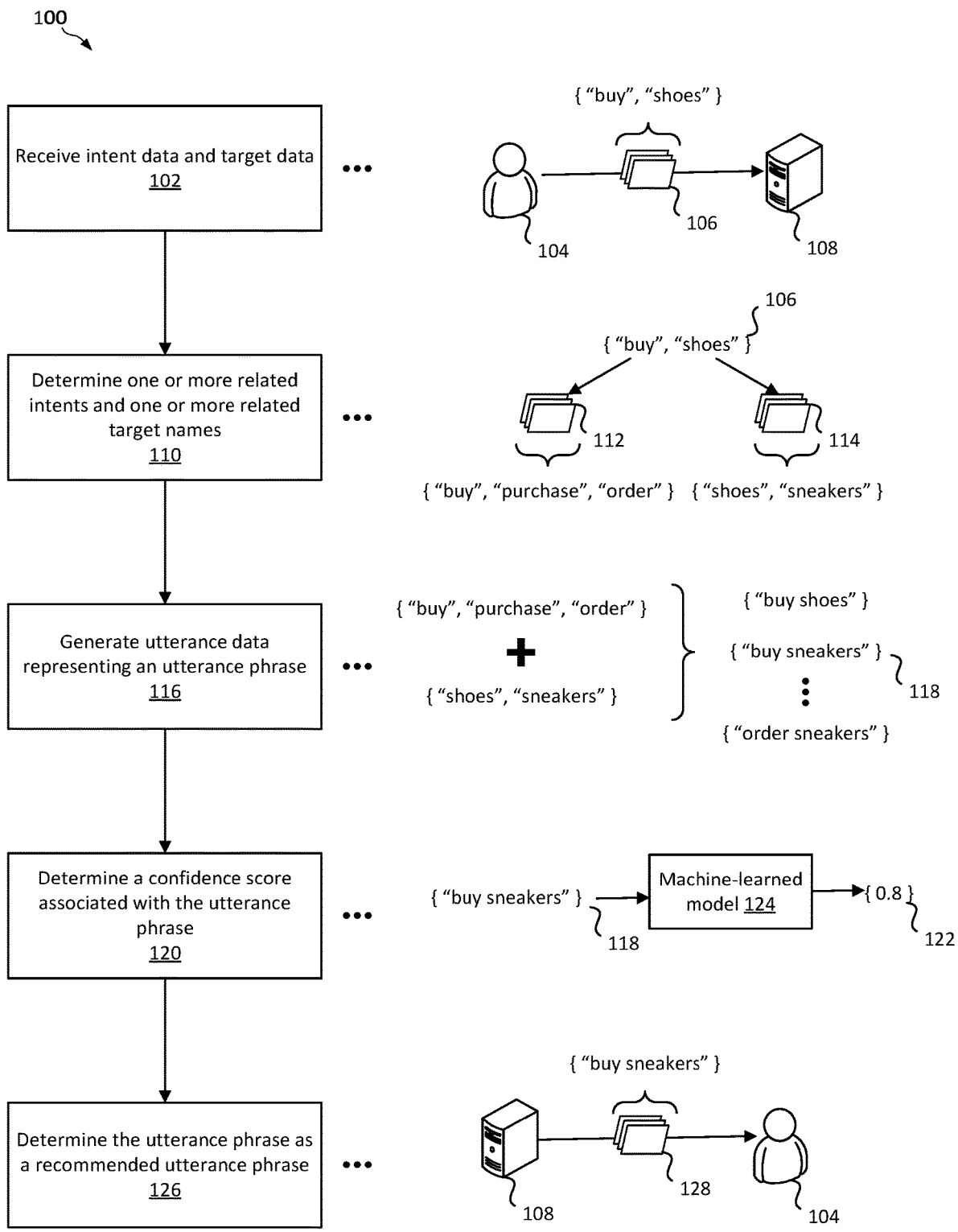
FIG. 1 is a pictorial flow diagram of an example process for determining a recommended utterance phrase, in accordance with various aspects of the present disclosure.

In the following description, reference is made to the accompanying drawings that illustrate several examples of the present disclosure. It is understood that other examples may be utilized and various operational changes may be made without departing from the scope of the present disclosure. The following detailed description is not to be taken in a limiting sense, and the scope of the embodiments of the present disclosure is defined only by the claims of the issued patent.

Automatic speech recognition (ASR) is a field of computer science, artificial intelligence, and linguistics concerned with transforming audio data associated with speech into text data representative and/or other encodings and/or machine representations of that speech. Natural language understanding (NLU) is a field of computer science, artificial intelligence, and linguistics concerned with enabling computers to derive meaning from text input containing natural language, rather than specific commands or instructions. Text-to-speech (TTS) is a field of computer science, artificial intelligence, and linguistics concerned with enabling computers to output synthesized speech. ASR, NLU, and TTS can be used together as part of a speech processing system.

Spoken language understanding (SLU) is a field of computer science, artificial intelligence, and/or linguistics that receives spoken language as an input, interprets the input, and generates commands that may be executed by one or more other computing devices and/or speech processing components. In various examples, spoken language understanding may be a combination of ASR systems and NLU systems, while in other examples, spoken language understanding may be a single model effective to perform the functions of both ASR and NLU. In various further examples, SLU may include TTS where a machine learning model may receive input audio data (e.g., a user utterance) and may generate output audio data in response to the utterance.

A speech-controlled computing system may answer user commands requesting the output of content. For example, a user may say "Computer, what is the weather." In response, the system may output weather information. For further example, a user may say "Computer, play music from the 90's." In response, the system may output music from the 1990's. Generally, input data received by the various speech processing systems and components described herein may comprise natural language input data. Natural language input data may be in the form of spoken user utterances (e.g., a spoken user request), text data (e.g., a request typed by a user), audio data, and/or some combination of spoken user utterances, text data, audio data, and/or other encodings and/or machine representations.

The system may be configured with multiple applications (e.g., thousands, tens of thousands, or more applications) that can be used to potentially respond to a user command. Applications may sometimes be referred to herein as "skills." For example, the system may include weather applications, music applications, video applications, calendar applications, timer applications, general knowledge answering applications, game applications, etc. Further, the system may be capable of operating many different applications that have an overlapping subject matter. For example, the system may include more than one application that can execute commands related to requests for weather information. For further example, the system may include one or more medical information applications that execute commands requesting medical information. Determining which application or applications may be applicable to handle an incoming user command is a non-trivial determination.

The invocation of a skill by a user's utterance may include a request that an action be taken. That request can be transmitted to a control system that will cause that action to be executed. For example, the user's utterance may be, "Computer, turn on the living room lights." In response, a "smart home" system may cause the lights in the user's living room to turn on. The number of applications/skills continues to grow and the rate of growth is increasing as developers become more accustomed to application programming interfaces (APIs) and application development kits provided for the voice service. Rule-based approaches and/or predefined utterance matching have been used in some systems for processing commands spoken in a certain format to invoke a particular application. The system (or an application) may require that the user's utterances conform to a predefined invocation pattern, such as "[Wake word], ask [application] to [payload]." One example could be, "Computer, ask Taxi Company to book me a ride to the library," with "Computer" being the wake word, "Taxi Company" being the application, and "book me a ride to the library" being the payload which is used by the Taxi Company application as a command input. While such predefined command structures may ease system processing in identifying the applicable application, inflexible command structures may also limit user freedom with regard to selecting a particular application or may be burdensome as users may need to memorize specific invocation patterns for a variety of different applications. It may be desirable to reduce the cognitive burden on a user to remember the exact structure required to invoke a specific application by enabling a user to invoke specific applications using natural language speech. This may allow for a reduction in the amount of computing resources needed to consider a large number of potential applications for each incoming command.

In at least some examples, a "skill," "skill component," and the like may be software running on a computing device, similar to a traditional software application running on a computing device. Such skills may include a voice user interface in addition to or instead of, in at least some instances, a graphical user interface, smart home device interface, and/or other type of interface.

In at least some examples, a "skill," "skill component," and the like may be software that is run by a third party, to the herein disclosed speech processing system, without the third party provisioning or managing one or more servers for executing the skill. In such an implementation, the system may be triggered to run a skill in response to the third party calling the system via the Internet or a mobile application.

In at least some examples, a "skill," "skill component," and the like may be securely run by a third party, to the herein disclosed system, without the third party's device(s) being connected to the Internet. Internet of Things (IoT) devices of a third party may use, for example an event-driven serverless computing platform, to interact with system resources and transmit data to the system (which may, in at least some implementations, be configured by the backend or other type of remote system).

In various examples, statistical NLU may be used to reduce the cognitive burden on the user. In an NLU-based approach, user utterances are typically classified into one or more intents and/or to one or more supported skills (or into an unsupported skill) followed by further skill-dependent intent and slot analyses (e.g., intent classification and entity extraction). In various examples, statistical NLU may be used to determine a list of intents, domains, skills, etc., that the user intended to invoke. In some instances, a user such as a brand manager, a skill developer, an institutional user, and the like, may want to determine whether an utterance will result in a desired outcome of the user. For example, a desired outcome can be invoking a skill intended by the user. By way of example and without limitation, invoking the skill can result in a desired action such as purchasing an item offered by an entity, controlling a connected computing device (e.g., a connected light bulb, a connected television, etc.), ordering a food item for delivery, and/or requested a ride sharing vehicle. The user can submit submitted utterance text (or other natural language input) that includes the intent and the target, which can be determined using, among other techniques, the slot analysis described above, to an utterance generation and evaluation system. The target can be the target of the intent of the utterance. By way of example and without limitation, the intent of the utterance can include a "buy" intent and the target can be the item that the user would like to purchase. In some instances, the intent of the utterance can be a "stream" intent and the target can be a media item that the user would like to consume and stream to a device. In some instances, the intent of the utterance can be an "order" intent and the target can be a food item that the user would like to order and/or have delivered to the user. In some instances, the intent of the utterance can be a "search" intent and the target can be a search keyword (e.g., searching for the current weather status of a location near the user). Because, poor recognition and translation of the spoken commands can lead to a disappointing and/or frustrating user experience, the utterance generation and evaluation system can evaluate the submitted utterance text and generate a confidence score indicating a likelihood that the speech-controlled computing system will invoke the appropriate skill to result in the desired outcome.

For example, a brand manager may want a particular "buy" intent of the brand manager's skill to be invoked to cause a specific item (e.g., a target) to be purchased when the consumer uses an utterance that includes a "buy" intent and the specific item's name. The brand manager can send the consumer-submitted utterance text to the utterance generation and evaluation system. The utterance generation and evaluation system can use historical transaction data to determine related intents and related item names. The historical transaction data can include, for example, anonymized and/or de-identified utterance audio data, utterance text data, and/or other encodings and/or machine representations of users associated with the search of items and/or content, the purchase of items and/or content, the consumption of items and/or content (e.g., ordering food items or streaming media content), the control of connected devices (e.g., controlled smart devices), etc.

By way of another example and without limitation, a skill developer may want a user to control (e.g., an intent) a connected device (e.g., a target) such as a speech-controlled speaker when the user uses an utterance that includes a "stream" intent and the name of a media item. The skill developer can send utterance text to the utterance generation and evaluation system such as, "play classical music" and the connected device can respond to the utterance by playing back classical music.

Using the historical transaction data, the utterance generation and evaluation system can identify related intent data based on the intent of the submitted utterance. The related intent data can indicate intents similar to the intent of the submitted utterance text. For example, the submitted utterance text can include a "buy" intent, which can be similar to an "order" intent, a "purchase" intent. These intents can invoke the buy skill to allow the user to buy the target time indicated in the utterance. Additionally, using the historical transaction data, the utterance generation and evaluation system can identify related target data based on the target of the submitted utterance text. For example, the submitted utterance text can include a "shoe" target, which can be similar to a "sneaker" target. In some instances, the utterance generation and evaluation system and can use a collaborative filtering model to determine the related intent data and/or the related target data, although other suitable models are contemplated. For example, the model, such as the collaborative filtering model or other suitable model, can use the historical transaction data to evaluate the initial input of users, such as searches conducted by users, and the actions taken by the users based on the results of the initial input. The model can use the actions taken by the users as ground truth data to determine if the initial input was accurate with respect to the desired outcome of the user. By way of example and without limitation, and as discussed above, the historical transaction data can indicate that users used initial input such as "buy," "order," "purchase," "ship," etc. to effect a desired outcome of ordering or purchasing an item. Based on this data, the model can determine that the "buy" intent can be associated with related intent data that includes "order," "purchase," and the like.

The utterance generation and evaluation system can generate utterance text for evaluation using the related intent data and the related target data. Based on the example above, the utterance generation and evaluation system can evaluate the submitted utterance text of "buy shoes." Additionally, the utterance generation and evaluation system can generate utterance text by combining portions of the related intent data and the related target data. For example, a set of generated utterance texts can include "buy sneakers," "order shoes," "order sneakers," etc. The generated utterance texts can provide a user such as a brand manager more variety of utterances that can be as effective or more effective at invoking the skill and/or providing the desired outcome of the user. For example, the utterance submitted by the user might commonly invoke a different skill due to a similarity in sound/interpretation. By generating and evaluating other utterances, the utterance generation and evaluation system can provide alternative utterances that can improve the ultimate user experience of both users such as brand managers and users alike.

The generated utterance texts, including the submitted utterance text, can be evaluated for efficacy in invoking the desired skill and producing the desired outcome of the user. For example, the utterance generation and evaluation system can use a machine-learned model to determine a confidence score associated with an utterance. In some instances, the machine-learned model can be trained using the historical transaction data and actions taken by users and/or feedback from users as ground truth data. For example, the historical transaction data can indicate that a user used an utterance such as "turn on my Brand X television." In some instances, the speech-controlled computing system can confirm with the user whether the desired action was taken and this can provide ground truth data indicating that the audio data and the interpretation of the audio data was correct. In some instances, the historical transaction data can indicate that the user followed the initial utterance with a subsequent utterance that reverses an action taken by a skill, which can indicate that the audio data and the interpretation of the audio data was incorrect.

The historical transaction data can be used to train the machine-learned model, which can output a confidence score associated with an input utterance text. For example, the input utterance text can be the submitted utterance text of the user. In some instances, the input utterance text can be the generated utterance text generated by the utterance generation and evaluation system. Based on the input utterance text, the machine-learned model can output a confidence score that can be represented as a numerical value with a range of 0 to 1 where a lower numerical value indicates a low likelihood of the input utterance text resulting in the desired outcome and where a higher numerical value indicates a high likelihood of in the input utterance text resulting in the desired outcome. However, other suitable numerical ranges are contemplated. Further, in some examples, the magnitude of the confidence scores may be inversely proportional to the likelihood of the input utterance text resulting in the desired outcome, depending on the desired implementation.

The utterance generation and evaluation system can compare the confidence score with a confidence score threshold. Based on the confidence score meeting or exceeding the confidence score threshold (or otherwise favorably comparing to an instituted confidence score threshold), the generation evaluation system can provide the utterance text to the user as a candidate utterance phrase, also referred to as a recommended utterance phrase.

In some instances, the utterance generation and evaluation system can generate utterance text based on an item number, which can be used to determine the slot text (e.g., the target data). For example, an item database can store a database of item numbers associated with items available for purchase in an online catalog. The utterance generation and evaluation system can use the historical transaction data to determine an initial intent and an initial target name (e.g., the target data) associated with an item number. For example, the historical transaction data can indicate that users frequently purchase Brand Y's paper towels by using the utterance "Buy Brand Y's paper towels." The utterance generation and evaluation system can determine related intent data based on the "buy" intent and determine related target data based on the "Brand Y's paper towels" target. Then, based on the related intent data and the related target data, the utterance generation and evaluation system can provide a recommended utterance phrase to, for example, a user without submitted utterance text from the user.

In some instances, the utterance generation and evaluation system can generate utterance audio samples, also referred to as utterance audio, based on the generated utterance text. For example, the utterance generation and evaluation system can use an utterance audio model such as a TTS system and input the utterance audio associated with the utterance text to the machine-learned model. The machine-learned model can output a confidence score associated with the utterance audio, perform a comparison of the confidence score with a confidence score threshold, and provide the utterance text associated with the utterance audio as a recommended utterance phrase based on the confidence score meeting or exceeding the confidence score threshold.

Based on the techniques described herein, an utterance generation and evaluation system can improve the user experience of interacting with a speech-controlled computing system can be improved by evaluating utterances and providing utterances with an increased likelihood of providing a desired outcome. Previous solutions included the use of one or more individuals speaking an utterance to a speech-controlled device. The one or more individuals would use different inflections, accents, and other varied speech patterns in order to provide a variety of utterances to the speech-controlled device. Based on the response of the speech-controlled device, the one or more individuals would then determine which utterances provided the desired outcome. This is a lengthy and expensive process which can be improved by the techniques described herein by providing an automated process for this evaluation.

FIG. 1 is a pictorial flow diagram of an example process 100 for receiving target data and intent data, determining related target names and related intents, determining a confidence score, and determining a recommended utterance phrase.

At operation 102, a user 104 can provide data 106 to an utterance generation and evaluation system 108 and the utterance generation and evaluation system 108 can receive the intent data and the target data based on the data 106. For example, the user 104 can be a brand manager that is responsible for the exposure and promotion of a brand and/or products associated with the brand to consumers. By way of example and without limitation, the brand manager can be associated with a brand named Brand X and be responsible for the sales of Brand X's shoes. The brand manager may desire to market the use of an utterance for consumers to use to purchase Brand X's shoes. Therefore, if a consumer used the utterance with a speech-controlled computing system, the outcome would be the consumer's purchase of Brand X's shoes. The user 104 can submit the data 106, which can include submitted intent data and submitted target data. For example, the intent data can include "buy" utterance text and the target data can include "shoes" utterance text as depicted in FIG. 1.

At operation 110, the utterance generation and evaluation system 108 can determine one or more related intents and one or more related target names. For example, the utterance generation and evaluation system can use the data 106 that includes the submitted intent data to determine one or more related intents 112. In some instances, the utterance generation and evaluation system 108 can use historical transaction data to determine the one or more related intents 112.

For example, the utterance generation and evaluation system 108 can access a database storing historical transaction data that includes audio data, utterance text data, and/or other encodings and/or machine representations of users associated with the search of items and/or content, the purchase of items and/or content, the consumption of items and/or content (e.g., ordering food items or streaming media content), the control of connected devices (e.g., controlled smart devices), etc. Using the historical transaction data, the utterance generation and evaluation system 108 can determine the one or more related intents 112 based on the intent of the submitted intent data. The one or more related intents 112 can indicate intents similar to the intent of the submitted data 106. As depicted in FIG. 1, the submitted data 106 can include a "buy" intent, which can be similar to an "order" intent, a "purchase" intent. Additionally, the using the historical transaction data, the utterance generation and evaluation system 108 can identify one or more related target names 114 based on the target of the submitted target data. For example, the submitted data can include a "shoes" target, which can be similar to a "sneaker" target. As discussed above, in some instances, the utterance generation and evaluation system 108 and can use a collaborative filtering model to determine the one or more related intents 112 and/or the one or more related target names 114, although other suitable models are contemplated.

At operation 116, the utterance generation and evaluation system 108 can generate utterance data representing an utterance phrase 118. For example, the utterance generation and evaluation system 108 can use the one or more related intents 112 and the one or more related target names 114 to determine the utterance data that represents the utterance phrase 118. This can be performed by combining an intent of the one or more related intents 112 with a target name of the one or more related target names 114. In some instances, the utterance generation and evaluation system 108 can generate one utterance phrase 118 or multiple utterance phrases. For example, the utterance generation and evaluation system 108 can use various permutations of the one or more related intents 112 and the one or more related target names 114 to generate the utterance phrase 118 or multiple utterance phrases.

At operation 120, the utterance generation and evaluation system 108 can determine a confidence score 122 associated with the utterance phrase 118. The confidence score can indicate a likelihood that the speech-controlled computing system will invoke the appropriate skill to result in the desired outcome. In some instances, the confidence score 122 can be output by a machine-learned model 124.

The historical transaction data can be used to train the machine-learned model 124. For example, the historical transaction data can indicate that a user used an utterance to make a purchase, control a device using a speech-controlled computing system, and the like. In some instances, the speech-controlled computing system can confirm with the user whether the correct action was taken and this can provide ground truth data indicating that the audio data and the interpretation of the audio data was correct. In some instances, the historical transaction data can indicate that the user followed the initial utterance with a subsequent utterance that reverses an action taken by a skill, which can indicate that the audio data and the interpretation of the audio data was incorrect. After training, the machine-learned model 124 can output the confidence score 122 associated with the utterance phrase 118. As discussed above, the a confidence score 122 can be represented as a numerical value with a range of 0 to 1 where a lower numerical value indicates a low likelihood of the input utterance text resulting in the desired outcome and where a higher numerical value indicates a high likelihood of in the input utterance text resulting in the desired outcome. However, other suitable numerical ranges are contemplated.

At operation 126, the utterance generation and evaluation system 108 can determine the utterance phrase 118 as a recommended utterance phrase 128. In some instances, the utterance generation and evaluation system 108 can compare the confidence score 122 to a confidence score threshold. Based on the confidence score 122 meeting or exceeding the confidence score threshold, the utterance generation and evaluation system 108 can determine the utterance phrase 118 as the recommended utterance phrase 128. In some instances, the utterance generation and evaluation system 108 can provide multiple recommended utterance phrases. For example, the utterance generation and evaluation system 108 can determine that more than one utterance phrase is associated with a confidence score than meets or exceeds the confidence score threshold and can result in providing multiple recommended utterance phrases.

Figure 2:
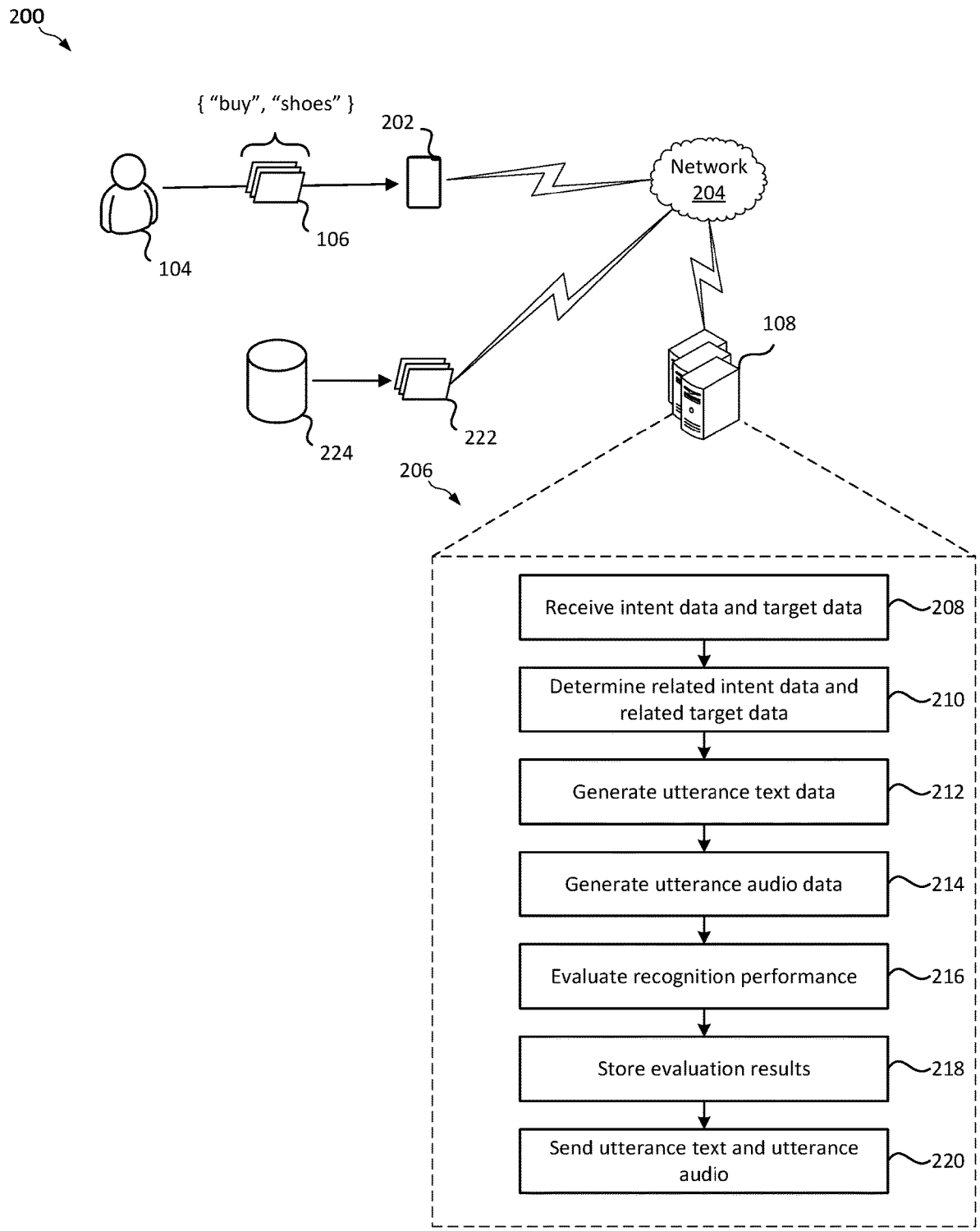
FIG. 2 is a conceptual illustration of a system configured to perform utterance generation and evaluation according to various embodiments of the present disclosure.

FIG. 2 illustrates a system 200 configured to perform utterance generation and evaluation according to various embodiments of the present disclosure. Although the figures and discussion illustrate certain operational steps of the system 200 in a particular order, in other embodiments the steps described may be performed in a different order (as well as certain steps removed or added). As shown in FIG. 2, the system 200 includes a computing devices 202 (e.g., local to a user 104) and the utterance generation and evaluation system 108 in communication with each other across one or more networks 204. The utterance generation and evaluation system 108 (which may be one or more different physical devices) may be capable of performing speech processing (e.g., ASR and NLU) as well as non-speech processing operations as described herein. A single utterance generation and evaluation system 108 may perform all speech processing or multiple utterance generation and evaluation systems 108 may combine to perform all speech processing.

As shown in FIG. 2, a device 202 may receive submitted data 106 including an intent and a target name. For example, the device 202 may receive text input by the user 104 via either a physical keyboard or virtual keyboard presented on a touch sensitive display of the device 202. The device 202 generates input text data and/or other encodings and/or machine representations corresponding to the text, and sends the submitted data 106 to the utterance generation and evaluation system 108 for processing. In other embodiments, the device 202 may detect spoken commands and perform speech recognition processing locally at the device 202 in order to translate those spoken commands into text data and/or other encodings and/or machine representations, which the device 202 then sends to the utterance generation and evaluation system 108.

In various examples, the process flow 206 may begin at action 208, "Receive intent data and target data". At action 208, the utterance generation and evaluation system 108 may receive the submitted data 106. The submitted data 106 may comprise an utterance that includes an intent and a target. The utterance generation and evaluation system 108 can determine the intent data and the target data based on an indication in the submitted data 106, which is provided to the utterance generation and evaluation system 108 for evaluation to determine whether the desired outcome will take place if a user uses the utterance that includes the intent and the target as provided in the submitted data 106. In various other examples, the utterance generation and evaluation system 108 may receive the submitted data 106 as text data and/or other encodings and/or machine representations.

In some examples, the process flow 206 may continue from action 208 to action 210, "Determine related intent data and related target data". A related data component can access historical transaction data to identify related intent data based on the intent of the submitted data 106. The related intent data can indicate intents similar to the intent associated with the submitted data 106. For example, the submitted utterance text can include a "buy" intent, which can be similar to an "order" intent, a "purchase" intent. Additionally, the using the historical transaction data, the utterance generation and evaluation system can identify related target data based on the target of the submitted utterance text. For example, the submitted utterance text can include a "shoe" target, which can be similar to a "sneaker" target. In some instances, the utterance generation and evaluation system and can use a collaborative filtering model to determine the related intent data and/or the related target data, although other suitable models are contemplated.

In further examples, the process flow 206 may continue from action 210 to action 212, "Generate utterance text data". At action 212, the utterance generation and evaluation system 108 can generate utterance text data representing utterance text based on the related intent data and the related target data. For example, the utterance generation and evaluation system 108 can evaluate the submitted data 106 text of "buy shoes." Additionally, the utterance generation and evaluation system 108 can generate utterance text data by combining portions of the related intent data and the related target data. For example, a set of generated utterance texts can include "buy sneakers," "order shoes," "order sneakers," "purchase shoes," "purchase sneakers," etc.

In various other examples, the process flow 206 may continue from action 212 to action 214, "Generate utterance audio". At action 214, the utterance generation and evaluation system 108 can use the utterance text data to generate utterance audio data representing utterance audio using, for example, a TTS system. In some instances, the utterance audio data generated can represent multiple utterance audios. For example, the utterance generation and evaluation system can use historical transaction data to determine the demographic data indicating the demographics of individuals that purchase the target items. The utterance generation and evaluation system 108 can use the TTS system to generate utterance audio data based on the demographic data.

By way of example and without limitation, the demographic data can indicate that individuals from a particular region in the United States are more likely to purchase a particular item indicated by the submitted data 106. The utterance generation and evaluation system 108 can invoke the TTS system to generate utterance audio that includes an accent associated with the particular region. In some instances, action 214 can use the TTS system to generate a variety of utterance audios including variations based on pitch, tone, frequency, volume, speech patterns, accents, age, gender, and/or language, and the like. For example, the TTS system can use, in some instances, a neural machine translation (NMT) engine to generate utterances in different languages. This can be used by a user of the utterance generation and evaluation system 108 to cover a wide array of consumers or individuals that might use the utterances.

In some instances, the user 104 can, with the submitted data 106, indicate the demographic data. For example, the user 104 can indicate that the user 104 would like to target specific groups of consumers. By way of example and without limitation, the user 104 can indicate in the submitted data 106 that the user 104 would like to target individuals within a specific age group. Based on that indication, the utterance generation and evaluation system 108 can generate utterance audio that is associated with voices of the specific age group.

In further examples, the process flow 206 may continue from action 214 to action 216, "Evaluate recognition performance". In evaluating the recognition performance, the utterance generation and evaluation system 108 can transmit the utterance audio to an SLU system. The SLU system can be configured to receive the utterance audio and perform speech recognition on the utterance audio. For example, a speech recognition component may transcribe the utterance audio into text data and/or other encodings and/or machine representations representing words of speech contained in the utterance audio. For example, the speech recognition component may interpret the utterance audio based on a similarity between the spoken utterance and pre-established language models. For example, the speech recognition component may compare the utterance audio with models for sounds (e.g., subword units or phonemes) and sequences of sounds to identify words that match the sequence of sounds spoken in the utterance audio.

Additionally, the SLU system can perform natural language processing on the text generated by the speech recognition component to generate NLU results. The natural language processing attempts to make a semantic interpretation of the text data and/or other encodings and/or machine representations. That is, the natural language processing determines the meaning behind the text data and/or other encodings and/or machine representations based on the individual words in the text data and/or other encodings and/or machine representations and then implements that meaning. The natural language processing interprets a text string to derive an intent or a desired action from the user as well as the pertinent pieces of information in the text data and/or other encodings and/or machine representations that allow a device to complete that action. The natural language processing may determine NLU results such as a domain of the utterance, one or more intents related to the utterance, and/or one or more skills for processing the utterance.

Additionally, a ranker component may rank the NLU results determined at action 216 based on a confidence score associated with each result. In various examples, a confidence score may represent the likelihood that a particular result correctly represents input data such as a user utterance, input text, and/or another natural language input. For example, the natural language processing may determine that "buy shoes" relates to the "purchase" intent and to the "search" intent. In various examples, a ranker component may determine that the "purchase" intent is more likely to have been intended relative to the "search" intent. Accordingly, the "purchase" intent may be ranked higher in a ranked list of NLU results than the "search" intent for the utterance audio "buy shoes".

In various other examples, the process flow 206 may continue from action 216 to action 218, "Store evaluation results." The utterance generation and evaluation system 108 may store the confidence score associated with the utterance audio and/or the utterance text. In some instances, the confidence score can be stored in a confidence score database for future access such that if an identical or similar evaluation request as the submitted data 106 is provided, the utterance generation and evaluation system 108 can quickly retrieve the confidence score from the confidence score database. This can reduce the use of computational resources, such as network bandwidth, processing resources, and the like by retrieving previously calculated data.

In further examples, the process flow 206 may continue from action 218 to action 220, "Transmit utterance text and utterance audio." At action 220, the utterance generation and evaluation system 108 can transmit the utterance text and utterance audio back to the user 104 through network 204 to the device 202. In some instances, the utterance generation and evaluation system 108 can transmit the confidence score associated with the utterance text and utterance audio.

In some instances, the utterance generation and evaluation system 108 can receive target identifier data 222. For example, the target identifier data 222 can be associated with an item available for purchase, a media item available for consumption, content retrievable using a search engine, a food item available for ordering, etc. The target identifier data 222 can represent a numeric value such as an identifier, a product identifier, a Uniform Product Code, International Standard Book Number, or other identification numbers. The utterance generation and evaluation system 108 can receive the target identifier data 222 from a target database 224. The target database 224 can store a plurality of identification numbers associated with the items, media items, food items, etc.

Using the target identifier data 222, the utterance generation and evaluation system 108 can determine the intent data and target data in action 208. For example, the utterance generation and evaluation system 108 can use the historical transaction data to determine an initial intent (e.g., the intent data) and an initial target name (e.g., the target data) associated with the target identifier data 222. For example, the historical transaction data can indicate that users frequently purchase the item associated with the target identifier data 222 using a particular utterance, set of utterances, search queries, etc. The utterance generation and evaluation system 108 can determine, using NLU, for example, the intent data and/or the target data and determine related target data as outlined in action 210. In the examples described above, various actions of process flow 206 are described as being performed by various components of a utterance generation and evaluation system 108. However, in at least some examples, the techniques described herein for utterance generation and evaluation may be performed at least in part by one or more speech-enabled devices, such as device 202.

Figure 3:
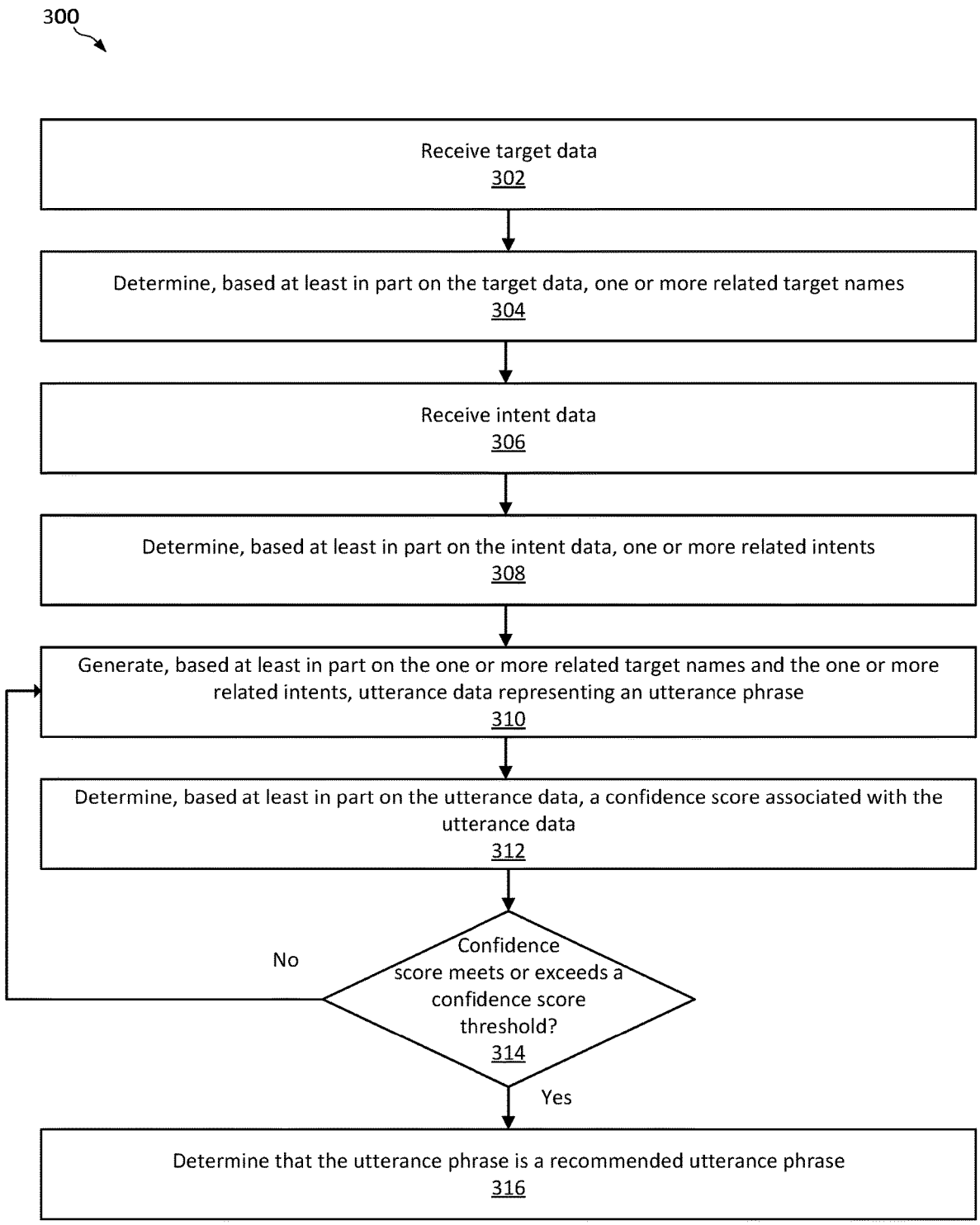
FIG. 3 is a flow diagram of an example process for determining a recommended utterance phrase according to various aspects of the present disclosure.

FIG. 3 is a flow diagram of an example process 300 for evaluating an utterance and determining a recommended utterance phrase.

At operation 302, the example process 300 can receive target data. In some instances, the example process 300 can receive target data based on data submitted by a user that includes a target name. In some instances, the example process 300 can determine the target data based on an item number. For example, operation 302 can use historical transaction data to determine target data associated with an item number and the search terms and/or utterances used by consumers to purchase the item number.

At operation 304, the example process 300 can determine, based at least in part on the target data, one or more related target names. Using the historical transaction data, operation 304 can identify related target names based on the target of submitted utterance text or the item number.

At operation 306, the example process 300 can receive intent data. In some instances, the example process 300 can receive intent data based on data submitted by a user that includes an intent. In some instances, the example process 300 can determine the intent data based on an item number. For example, operation 306 can use historical transaction data to determine intent data associated with an item number and the search terms and/or utterances used by consumers associated with the item number. By way of example and without limitation, the historical transaction data can indicate that users more frequently request to stream a media item compared to purchasing the media item.

At operation 308, the example process 300 can determine, based at least in part on the intent data, one or more related intents. As discussed above with respect to operation 308, the historical transaction data can indicate related intents.

In some instances, and as discussed above, the operations 304 and/or 308 and can use a collaborative filtering model to determine the related intent data and/or the related target data, although other suitable models are contemplated.

At operation 310, the example process 300 can generate, based at least in part on the one or more related target names and the one or more related intents, an utterance phrase. For example, operation 310 can use the one or more related intents and the one or more related target names to generate utterance data representing an utterance phrase. This can be performed by combining an intent of the one or more related intents with a target name of the one or more related target names.

At operation 312, the example process 300 can determine, based at least in part on the utterance data, a confidence score associated with the utterance data. In some instances, the operation 312 can use a machine-learned model to determine the confidence score associated with an utterance. In some instances, the machine-learned model can be trained using the historical transaction data and actions taken by users and/or feedback from users as ground truth data.

At operation 314, the example process 300 can compare the confidence score to a confidence score threshold. If the confidence score meets or exceeds the confidence score threshold, the example process 300 can proceed to operation 316. If the confidence score does not meet or exceed the confidence score threshold, the example process 300 can proceed to operation 310.

At operation 316, the example process 300 can determine that the utterance phrase is a recommended utterance phrase.

Figure 4:
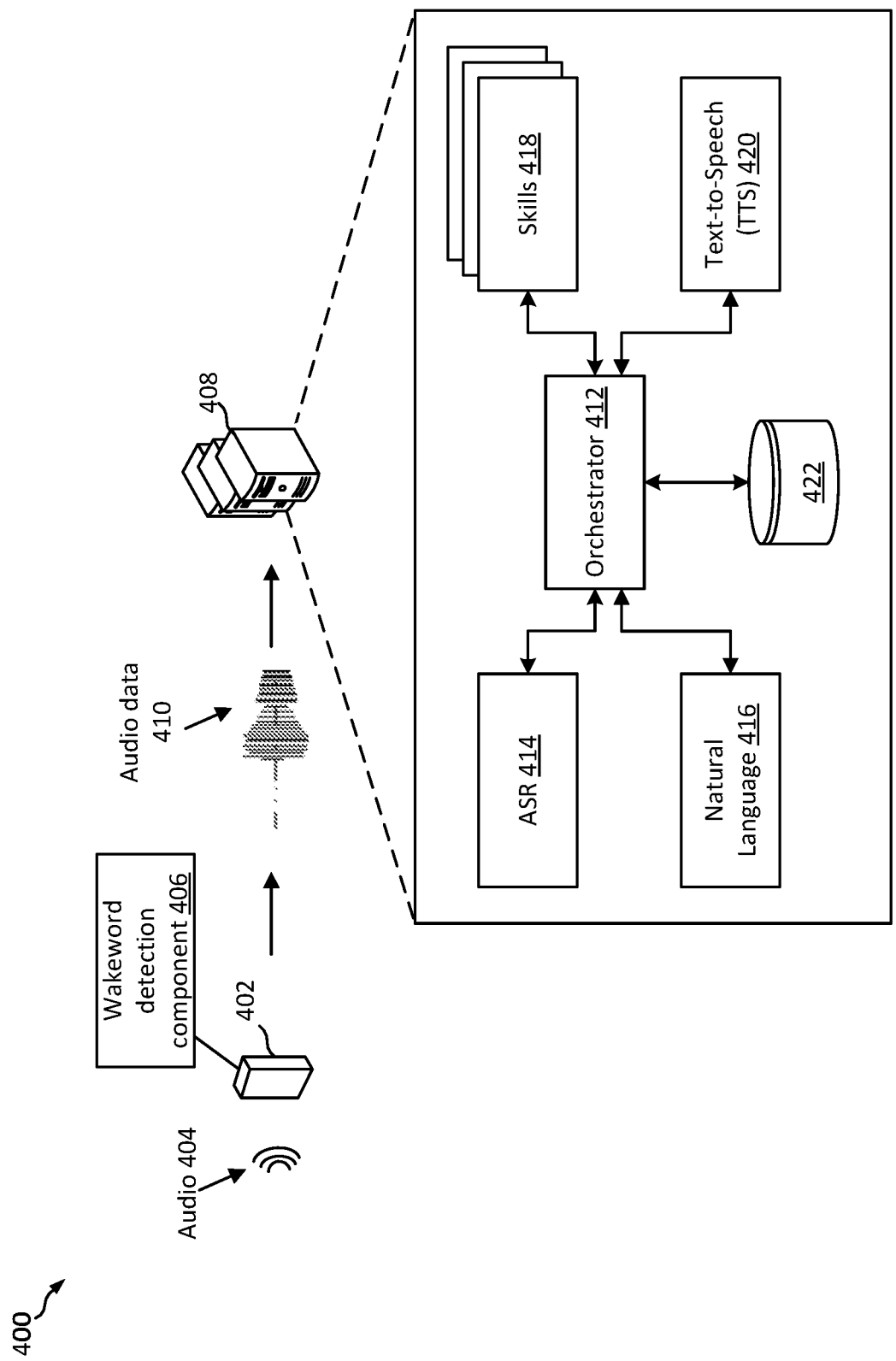
FIG. 4 is a block diagram of various components of a remote system that may be used in accordance with various aspects of the present disclosure.

FIG. 4 is a block diagram 400 of various components of a remote system that may be used in accordance with various aspects of the present disclosure. Although not necessarily limited to such, the system may operate using various natural language processing components as described in FIG. 4. The various components may be located on same or different physical devices. Communication between various components may occur directly or across a network(s).

An audio capture component(s), such as a microphone or array of microphones of the device 402, captures audio 404.

The device 402 processes audio data, representing the audio 404, to determine whether speech is detected. The device 402 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 402 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 404, the device 402 may use a wakeword detection component 406 to perform wakeword detection to determine when a user intends to speak an input to the device 402. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 404 may be analyzed to determine if specific characteristics of the audio data match preconfigured acoustic waveforms, audio signatures, or other data to determine if the audio data "matches" stored audio data corresponding to a wakeword. The stored audio data may be provided by a natural language processing system 408 and/or may be provided by the user.

The wakeword detection component 406 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 406 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 402 may wake and begin transmitting audio data 410, representing the audio 404, to the natural language processing system 408. The audio data 410 may include data corresponding to the wakeword, or the portion of the audio data 410 corresponding to the wakeword may be removed by the device 402 prior to sending the audio data 410 to the natural language processing system 408.

Upon receipt by the natural language processing system 408, the audio data 410 may be sent to an orchestrator component 412. The orchestrator component 412 may include memory and logic that enable the orchestrator component 412 to transmit various pieces and forms of data to various components of the system, as well as perform other operations. The orchestrator component 412 sends the audio data 410 to an ASR component 414. The ASR component 414 transcribes the audio data 410 into text data and/or other encodings and/or machine representations. The text data and/or other encodings and/or machine representations output by the ASR component 414 represents one or more than one (e.g., in the form of an N-best list) hypotheses representing speech represented in the audio data 410. The ASR component 414 interprets the speech in the audio data 410 based on a similarity between the audio data 410 and pre-established language models. For example, the ASR component 414 may compare the audio data 410 with models for sounds (e.g., subword units, such as phonemes, etc.) and sequences of sounds to identify words that match the sequence of sounds of the speech represented in the audio data 410. The ASR component 414 sends the text data and/or other encodings and/or machine representations generated thereby to an NLU component 416, for example via the orchestrator component 412. The text data and/or other encodings and/or machine representations sent from the ASR component 414 to the NLU component 416 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 416 attempts to make a semantic interpretation of the phrases or statements represented in the text data and/or other encodings and/or machine representations input therein. That is, the NLU component 416 determines one or more meanings associated with the phrases or statements represented in the text data and/or other encodings and/or machine representations based on words represented in the text data and/or other encodings and/or machine representations. The NLU component 416 determines an intent (e.g., intent data) representing an action that a user desires be performed as well as pieces of the input text data and/or other encodings and/or machine representations that allow a device (e.g., the device 402, the natural language processing system 408, etc.) to execute the intent. For example, if the text data and/or other encodings and/or machine representations corresponds to "call John," the NLU component 416 may determine an intent that the system establish a two-way communication channel between the device 402 originating the call and a device of the recipient "John." For further example, if the text data and/or other encodings and/or machine representations corresponds to "tell John I am on my way," the NLU component 416 may determine an intent that the system send a message to a device of the recipient "John," with the message corresponding to "I am on my way."

The NLU component 416 outputs NLU results to the orchestrator component 412. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence score representing a confidence of the NLU component 416 in the processing performed to generate the NLU hypothesis associated with the confidence score.

The orchestrator component 412 may send the NLU results to an associated skill component 418. If the NLU results include multiple NLU hypotheses, the orchestrator component 412 may send a portion of the NLU results corresponding to the top scoring NLU hypothesis to a skill component 418 associated with the top scoring NLU hypothesis.

A "skill" or "skill component" may be software running on the natural language processing system 408 that is akin to a software application running on a traditional computing device. That is, a skill component 418 may enable the natural language processing system 416 to execute specific functionality in order to perform one or more actions (e.g., provide information to a user, display content to a user, output music, or perform some other requested action). The natural language processing system 408 may be configured with more than one skill component 418. For example, a weather skill component may enable the natural language processing system 408 to provide weather information, a ride sharing skill component may enable the natural language processing system 408 to schedule a trip with respect to a ride sharing service, a restaurant skill component may enable the natural language processing system 408 to order food with respect to a restaurant's online ordering system, a communications skill component may enable the system to perform messaging or multi-endpoint communications, etc. A skill component 418 may operate in conjunction between the natural language processing system 408 and other devices such as the device 402 in order to complete certain functions. Inputs to a skill component 418 may come from various interactions and input sources. A skill component may include a communications skill 418a which may correspond to a service for performing media processing that may be operated, for example, by an MPU as discussed below.

The functionality described herein as a skill or skill component may be referred to using many different terms, such as an action, bot, app, application, speechlet or the like. A skill component 418 may include hardware, software, firmware, or the like that may be dedicated to the particular skill component 418 or shared among different skill components 418. A skill component 418 may be part of the natural language processing system 408 (as illustrated in FIG. 4) or may be located at whole (or in part) with one or more separate systems. Unless expressly stated otherwise, reference to a skill, skill device, or skill component may include a skill component operating within the natural language processing system 408 (for example as skill component 418) and/or skill component operating within a system separate from the natural language processing system 408.

A skill component 418 may be configured to perform one or more actions. A skill may enable a skill component 418 to execute specific functionality in order to provide data or produce some other output requested by a user. A particular skill component 418 may be configured to execute more than one skill. For example, a weather skill may involve a weather skill component providing weather information to the natural language processing system 408, a ride sharing skill may involve a ride sharing skill component scheduling a trip with respect to a ride sharing service, an order pizza skill may involve a restaurant skill component ordering pizza with respect to a restaurant's online ordering system, etc.

A skill component 418 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 408 may include a TTS component 420 that generates audio data (e.g., synthesized speech) from text data and/or other encodings and/or machine representations using one or more different methods. In one method of synthesis called unit selection, the TTS component 420 matches text data and/or other encodings and/or machine representations against a database of recorded speech. The TTS component 420 selects matching units of recorded speech and concatenates the units together to form audio data. In another method of synthesis called parametric synthesis, the TTS component 420 varies parameters such as frequency, volume, and noise to create audio data including an artificial speech waveform. Parametric synthesis uses a computerized voice generator, sometimes called a vocoder.

The natural language processing system 408 may include profile storage 422. The profile storage 422 may include a variety of information related to individual users, groups of users, etc. that interact with the system. The profile storage 422 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 422 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 4 as a separate component, natural language processing system 408 may be executed wholly or partially by device 402.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 402, or other devices discussed herein.

The natural language processing system 408 may include a user recognition component that recognizes one or more users associated with data input to the system. The user recognition component may take as input the audio data 410, text data, and/or other encodings and/or machine representations output by the ASR component 414. The user recognition component determines scores indicating whether user input originated from a particular user. For example, a first score may indicate a likelihood that the user input originated from a first user, a second score may indicate a likelihood that the user input originated from a second user, etc. The user recognition component also determines an overall confidence regarding the accuracy of user recognition operations. The user recognition component may perform user recognition by comparing audio characteristics in the audio data 410 to stored audio characteristics of users. The user recognition component may also perform user recognition by comparing biometric data (e.g., fingerprint data, iris data, etc.), received by the system in correlation with the present user input, to stored biometric data of users. The user recognition component may further perform user recognition by comparing image data (e.g., including a representation of at least a feature of a user), received by the system in correlation with the present user input, with stored image data including representations of features of different users. The user recognition component may perform additional user recognition processes, including those known in the art. Output of the user recognition component may include a single user identifier corresponding to the most likely user that originated the present user input. Alternatively, output of the user recognition component may include an N-best list of user identifiers with respective scores indicating likelihoods of respective users originating the present user input. The output of the user recognition component may be used to inform NLU processing as well as processing performed by other components of the system.

Figure 5:
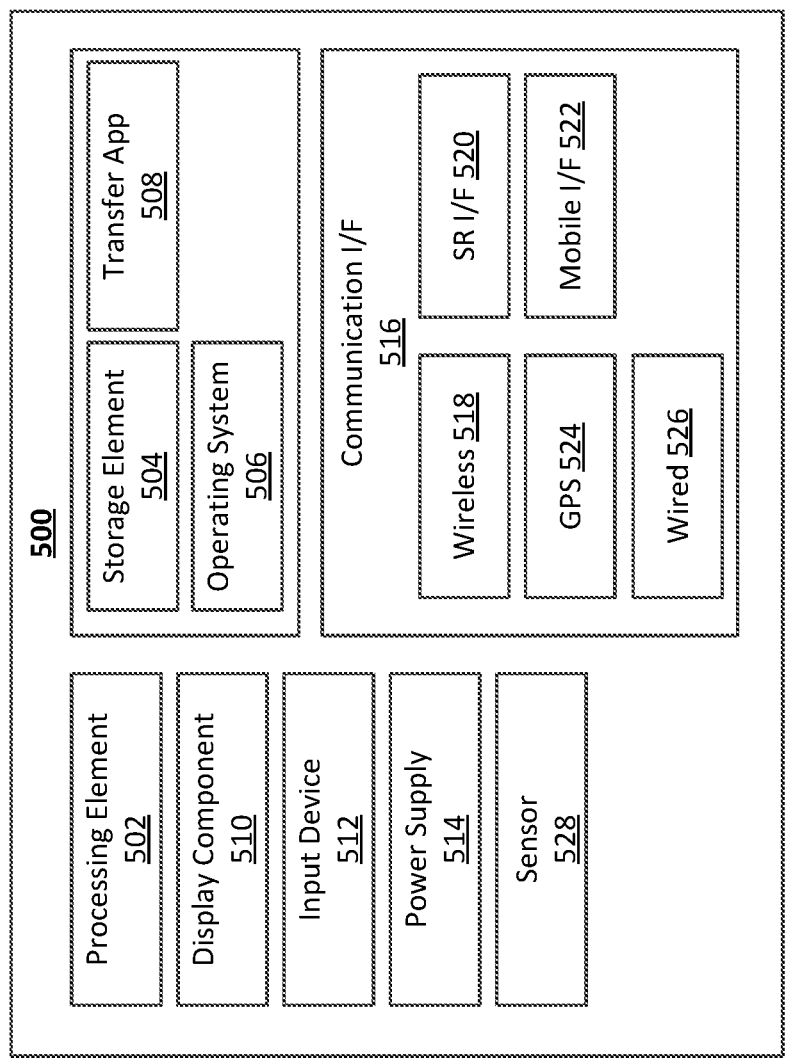
FIG. 5 is a system diagram of an illustrative computer architecture that can be used in accordance with various embodiments described herein.

FIG. 5 is a block diagram showing an example architecture 500 of a computing device used to at least partially implement an utterance generation and evaluation system, in accordance with various aspects of the present disclosure. It will be appreciated that not all devices will include all of the components of the example architecture 500 and some user devices may include additional components not shown in the example architecture 500. In an example embodiment, the example architecture 500 includes one or more processing elements 502 for executing instructions and retrieving data stored in a storage element 504. The processing element 502 comprises at least one processor. Any suitable processor or processors may be used. For example, the processing element 502 may comprise one or more digital signal processors (DSPs). The storage element 504 can include one or more different types of memory, data storage, or computer-readable storage media devoted to different purposes within the example architecture 500. In an example embodiment, the storage element 504 comprises flash memory, random-access memory, disk-based storage, etc. Different portions of the storage element 504, for example, are used for program instructions for execution by the processing element 502, storage of images or other digital works, and/or a removable storage for transferring data to other devices, etc. Additionally, storage element 504 may store various costs, shards, parameters of machine learning models, vocabulary data structures, etc.

The storage element 504 may also store software for execution by the processing element 502. An operating system 506 may provide the user with an interface for operating the computing device and may facilitate communications and commands between applications executing on the example architecture 500 and various hardware thereof. In an example embodiment, a transfer application 508 is configured to receive images, audio, and/or video from another device (e.g., a mobile device, image capture device, and/or display device) included in the example architecture 500.

When implemented in some user devices, the example architecture 500 comprises a display component 510. The display component 510 can comprise one or more light-emitting diodes (LEDs) or other suitable display lamps. Also, in some examples, the display component 510 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 510 may be effective to display input images.

The example architecture 500 may also include one or more input devices 512 operable to receive inputs from a user. The one or more input devices 512 can include a push button, touch pad, touch screen, wheel, joystick, keyboard, mouse, trackball, keypad, light gun, game controller, or any other such device or element whereby a user can provide inputs to the example architecture 500. These input devices 512 may be incorporated into the example architecture 500 or operably coupled to the example architecture 500 via wired or wireless interface.

When the display component 510 includes a touch-sensitive display, the input devices 512 can include a touch sensor that operates in conjunction with the display component 510 to permit users to interact with the image displayed by the display component 510 using touch inputs (e.g., with a finger or stylus). The example architecture 500 may also include a power supply 514, such as a wired alternating current (AC) converter, a rechargeable battery operable to be recharged through conventional plug-in approaches, or through other approaches such as capacitive or inductive charging.

In an embodiment, the communication interface 516 comprises one or more wired or wireless components operable to communicate with one or more other computing devices. For example, the communication interface 516 may comprise a wireless communication module 518 configured to communicate on a network according to any suitable wireless protocol, such as IEEE 802.11 or another suitable wireless local area network (WLAN) protocol. In an embodiment, a short range interface 520 is configured to communicate using one or more short range wireless protocols such as, for example, near field communications (NFC), Bluetooth®, Bluetooth LE, etc. In an embodiment, a mobile interface 522 is configured to communicate utilizing a cellular or other mobile protocol. A Global Positioning System (GPS) interface 524 may be in communication with one or more earth-orbiting satellites or other suitable position-determining systems to identify a position of the example architecture 500. In an embodiment, a wired communication module 526 is configured to communicate according to the USB protocol or any other suitable protocol.

The example architecture 500 may also include one or more sensors 528 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the system 500, as described herein, are exemplary, and may be located as a stand-alone device or may be included, in whole or in part, as a component of a larger device or system.

Figure 6:
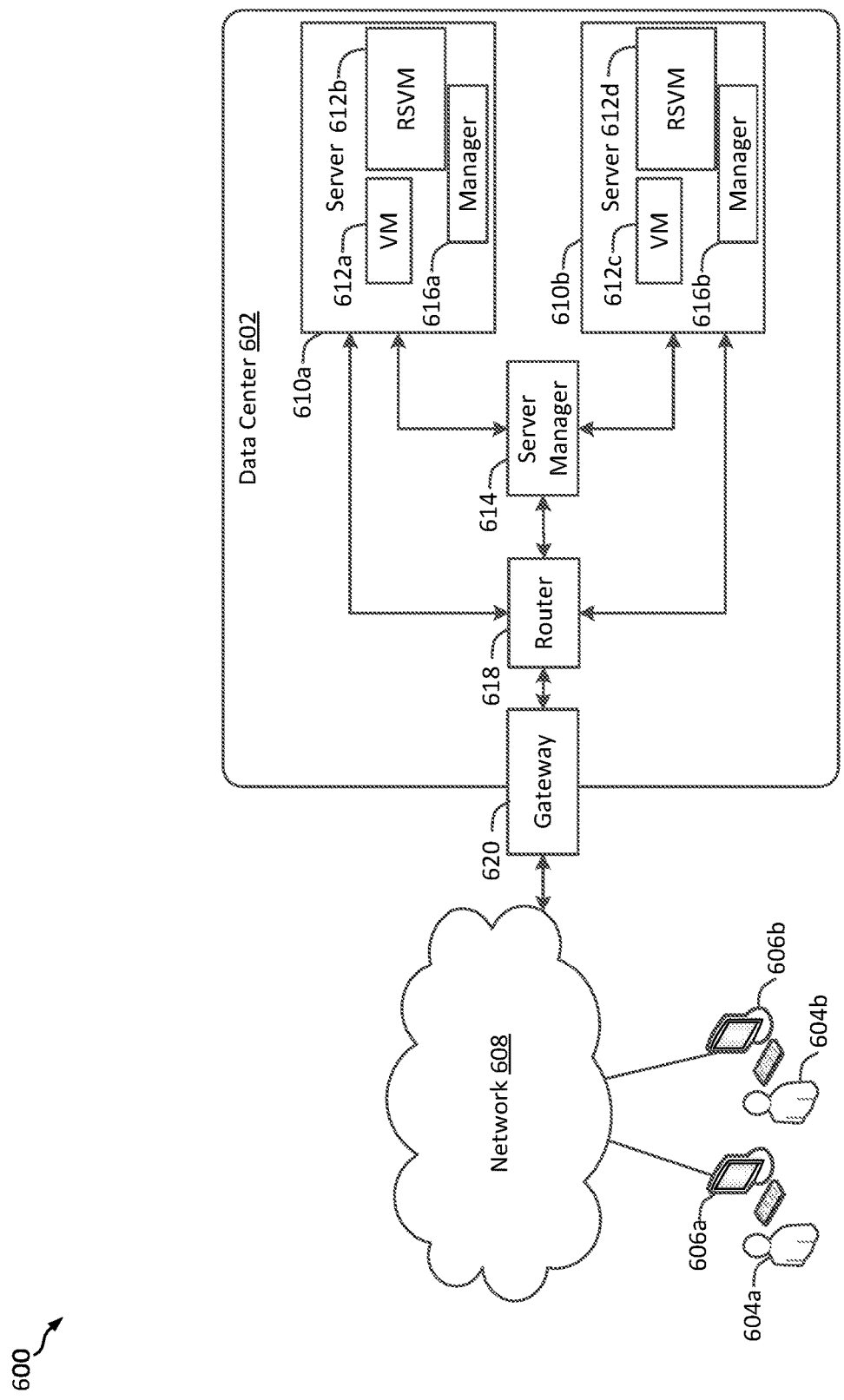
FIG. 6 is a diagram illustrating an example system for sending and providing data that may be used in accordance with the present disclosure.

An example system for sending and providing data and performing various computer processing techniques will now be described in detail. In particular, FIG. 6 illustrates an example computing environment 600 in which the embodiments described herein may be implemented. For example, the computing environment of FIG. 6 may be used to provide ranking of query results as a service over a network wherein one or more of the techniques described herein may be requested by a first computing device and may be performed by a different computing device configured in communication with the first computing device over a network. FIG. 6 is a diagram schematically illustrating an example of a data center 602 that can provide computing resources to users 604*a* and 606 (which may be referred herein singularly as user 604 or in the plural as users 604) via user computers 606*a* and 606*b* (which may be referred herein singularly as user computer 606 or in the plural as user computers 606) via network 608. Data center 602 may be configured to provide computing resources for executing applications on a permanent or an as-needed basis. The computing resources provided by data center 602 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the utterance generation and evaluation system 108, as described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 602 may include servers 610*a* and 610*b* (which may be referred herein singularly as server 610 or in the plural as servers 610) that provide computing resources. These resources may be available as bare metal resources or as virtual machine instances 612*a*—d (which may be referred herein singularly as virtual machine instance 612 or in the plural as virtual machine instances 612). In at least some examples, server manager 614 may control operation of and/or maintain servers 610. Virtual machine instances 612*b* and 612*d* are rendition switching virtual machine ("RSVM") instances. The RSVM virtual machine instances 612*b* and 612*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 608 may, for example, be a publicly accessible network of linked networks and possibly operated by various distinct parties, such as the Internet. In other embodiments, network 608 may be a private network, such as a corporate or university network that is wholly or partially inaccessible to non-privileged users. In still other embodiments, network 608 may include one or more private networks with access to and/or from the Internet.

Network 608 may provide access to user computers 606. User computers 606 may be computers utilized by users 604 or other customers of data center 602. For instance, user computer 606a or 606b may be a server, a desktop or laptop personal computer, a tablet computer, a wireless telephone, a personal digital assistant (PDA), an e-book reader, a game console, a set-top box or any other computing device capable of accessing data center 602. User computer 606a or 606b may connect directly to the Internet (e.g., via a cable modem or a Digital Subscriber Line (DSL)). Although only two user computers 606a and 606b are depicted, it should be appreciated that there may be multiple user computers.

User computers 606 may also be utilized to configure aspects of the computing resources provided by data center 602. In this regard, data center 602 might provide a gateway or web interface through which aspects of its operation may be configured through the use of a web browser application program executing on user computer 606. Alternately, a stand-alone application program executing on user computer 606 might access an application programming interface (API) exposed by data center 602 for performing the configuration operations. Other mechanisms for configuring the operation of various web services available at data center 602 might also be utilized.

Servers 610 shown in FIG. 6 may be servers configured appropriately for providing the computing resources described above and may provide computing resources for executing one or more web services and/or applications. In one embodiment, the computing resources may be virtual machine instances 612. In the example of virtual machine instances, each of the servers 610 may be configured to execute an instance manager 616a or 616b (which may be referred herein singularly as instance manager 616 or in the plural as instance managers 616) capable of executing the virtual machine instances 612. The instance managers 616 may be a virtual machine monitor (VMM) or another type of program configured to enable the execution of virtual machine instances 612 on server 610, for example. As discussed above, each of the virtual machine instances 612 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 602 shown in FIG. 6, a router 618 may be utilized to interconnect the servers 610a and 610b. Router 618 may also be connected to gateway 620, which is connected to network 608. Router 618 may be connected to one or more load balancers, and alone or in combination may manage communications within networks in data center 602, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 602 shown in FIG. 6, a data center 602 is also employed to at least in part direct various communications to, from and/or between servers 610a and 610b. While FIG. 6 depicts router 618 positioned between gateway 620 and data center 602, this is merely an exemplary configuration. In some cases, for example, data center 602 may be positioned between gateway 620 and router 618. Data center 602 may, in some cases, examine portions of incoming communications from user computers 606 to determine one or more appropriate servers 610 to receive and/or process the incoming communications. Data center 602 may determine appropriate servers to receive and/or process the incoming communications based on factors such as an identity, location, or other attributes associated with user computers 606, a nature of a task with which the communications are associated, a priority of a task with which the communications are associated, a duration of a task with which the communications are associated, a size and/or estimated resource usage of a task with which the communications are associated and many other factors. Data center 602 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 602 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may, in some embodiments, be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of utterance generation and evaluation comprising:
   receiving item name data associated with an item in an online catalog;
   inputting, into a collaborative filtering model, the item name data;
   receiving, from the collaborative filtering model, a plurality of related item names determined by the collaborative filtering model to be similar to the item name data;
   receiving intent data related to an action associated with the item;
   inputting, into the collaborative filtering model, the intent data;
   receiving, from the collaborative filtering model, a plurality of related user intents determined by the collaborative filtering model to be similar to the intent data;
   determining an utterance phrase by combining an individual related item name and an individual related user intent;
   inputting, into an utterance audio model, the utterance phrase;
   receiving, from the utterance audio model, a plurality of utterance audio samples;
   inputting, into a machine learned model, the plurality of utterance audio samples;
   receiving, from the machine learned model, a plurality of confidence scores, wherein an individual confidence score of the plurality of confidence scores is associated with an individual utterance audio sample of the plurality of utterance audio samples;
   determining that the individual confidence score meets or exceeds a confidence score threshold; and
   determining the utterance phrase as a candidate utterance phrase.

2. The method of claim 1, further comprising:
   determining historical transaction data; and
   inputting, into the collaborative filtering model, the historical transaction data;
   wherein the plurality of related item names and the plurality of related user intents is based at least in part on the historical transaction data.

3. The method of claim 1, further comprising:
   determining historical transaction data; and
   inputting, into the utterance audio model, the historical transaction data;
   wherein the plurality of utterance audio samples is based at least in part on the historical transaction data.

4. The method of claim 1, further comprising:
   determining, by querying an item database, an item type associated with the item indicating one of a media type or an object type; and
   inputting, into the collaborative filtering model, the item type;
   wherein the plurality of related user intents is based at least in part on the item type, each of the plurality of related user intents comprising one of a stream intent or a purchase intent.

5. A method comprising:
   receiving target data describing content included in a database;
   inputting the target data into a first machine learning model executed by at least one processor;
   determining, by the first machine learning model based at least in part on the target data, one or more related target names;
   receiving intent data related to an action associated with the content;
   inputting the intent data into the first machine learning model executed by the at least one processor;
   determining, by the first machine learning model based at least in part on the intent data, one or more related intents;
   generating, based at least in part on the one or more related target names and the one or more related intents, utterance data representing an utterance phrase;
   inputting the utterance data into a second machine learned model executed by the at least one processor;
   determining, by the second machine learned model based at least in part on the utterance data, a confidence score associated with the utterance data; and
   determining, based at least in part on the confidence score, that the utterance phrase is a recommended utterance phrase; and
   sending, to a remote computing device, the utterance data.

6. The method of claim 5, further comprising:
   inputting, into a third machine learned model, the utterance data;
   receiving, from the third machine learned model, an utterance audio sample; and
   sending, to the remote computing device, the utterance audio sample.

7. The method of claim 5, wherein the remote computing device is a first remote computing device, the method further comprising:
   sending, to a second remote computing device, the utterance data;
   receiving, from the second remote computing device, a human utterance audio sample; and
   sending, to the first remote computing device, the human utterance audio sample.

8. The method of claim 5, wherein the target data is associated with at least one of a target item available for purchase in an online catalog, a target media item available for consumption, or a target computing device; and
   wherein the intent data is associated with at least one of a purchasing intent, a consuming intent, or a command to control the target computing device.

9. The method of claim 5, further comprising:
   accessing historical transaction data; and determining an identifier, wherein receiving the target data and receiving the intent data is based at least in part on the identifier and the historical transaction data.

10. The method of claim 9, further comprising:
determining, based at least in part on the historical transaction data, demographic data associated with the target data; and
determining, based at least in part on the demographic data and the utterance data, an utterance audio sample.

11. The method of claim 5, further comprising:
receiving device data indicating a type of user device, wherein determining the one or more related intents is further based at least in part on the device data.

12. The method of claim 5, further comprising:
determining user data indicating at least one a user gender, a user age, or a user region, wherein determining the one or more related target names or the one or more related intents is based at least in part on the user data.

13. A non transitory computer readable medium storing instructions executable by a processor, wherein the instructions, when executed, cause the processor to perform operations:
receiving target data describing content included in a database;
inputting the target data into a first machine learning model executed by at least a first processor;
determining, by the first machine learning model based at least in part on the target data, one or more related target names;
receiving intent data related to an action associated with the content;
inputting the intent data into the first machine learning model executed by at least the first processor;
determining, by the first machine learning model based at least in part on the intent data, one or more related intents;
generating, based at least in part on the one or more related target names and the one or more related intents, utterance data representing an utterance phrase;
inputting the utterance data into a second machine learned model;
determining, by the second machine learned model based at least in part on the utterance data, a confidence score associated with the utterance data; and
determining, based at least in part on the confidence score, that the utterance phrase is a recommended utterance phrase; and
sending, to a remote computing device, the utterance data.

14. The non transitory computer readable medium of claim 13, the operations further comprising:
inputting, into a third machine learned model, the utterance data;
receiving, from the third machine learned model, an utterance audio sample; and
sending, to the remote computing device, the utterance audio sample.

15. The non transitory computer readable medium of claim 13, wherein the remote computing device is a first remote computing device, the operations further comprising:
sending, to a second remote computing device, the utterance data;
receiving, from the second remote computing device, a human utterance audio sample; and
sending, to the first remote computing device, the human utterance audio sample.

16. The non transitory computer readable medium of claim 13, wherein the target data is associated with at least one of a target item available for purchase in an online catalog, a target media item available for consumption, or a target computing device; and
wherein the intent data is associated with at least one of a purchasing intent, a consuming intent, or a command to control the target computing device.

17. The non transitory computer readable medium of claim 13, the operations further comprising:
accessing historical transaction data; and
determining an identifier number, wherein receiving the target data and receiving the intent data is based at least in part on the identifier number and the historical transaction data.

18. The non transitory computer readable medium of claim 13, the operations further comprising:
receiving device data indicating a type of user device, wherein determining the one or more related intents is further based at least in part on the device data.

* * * * *